Oct. 21, 1952     W. E. COX     2,615,121
ILLUMINATING SYSTEM FOR PAINTINGS AND THE LIKE
Filed May 12, 1949
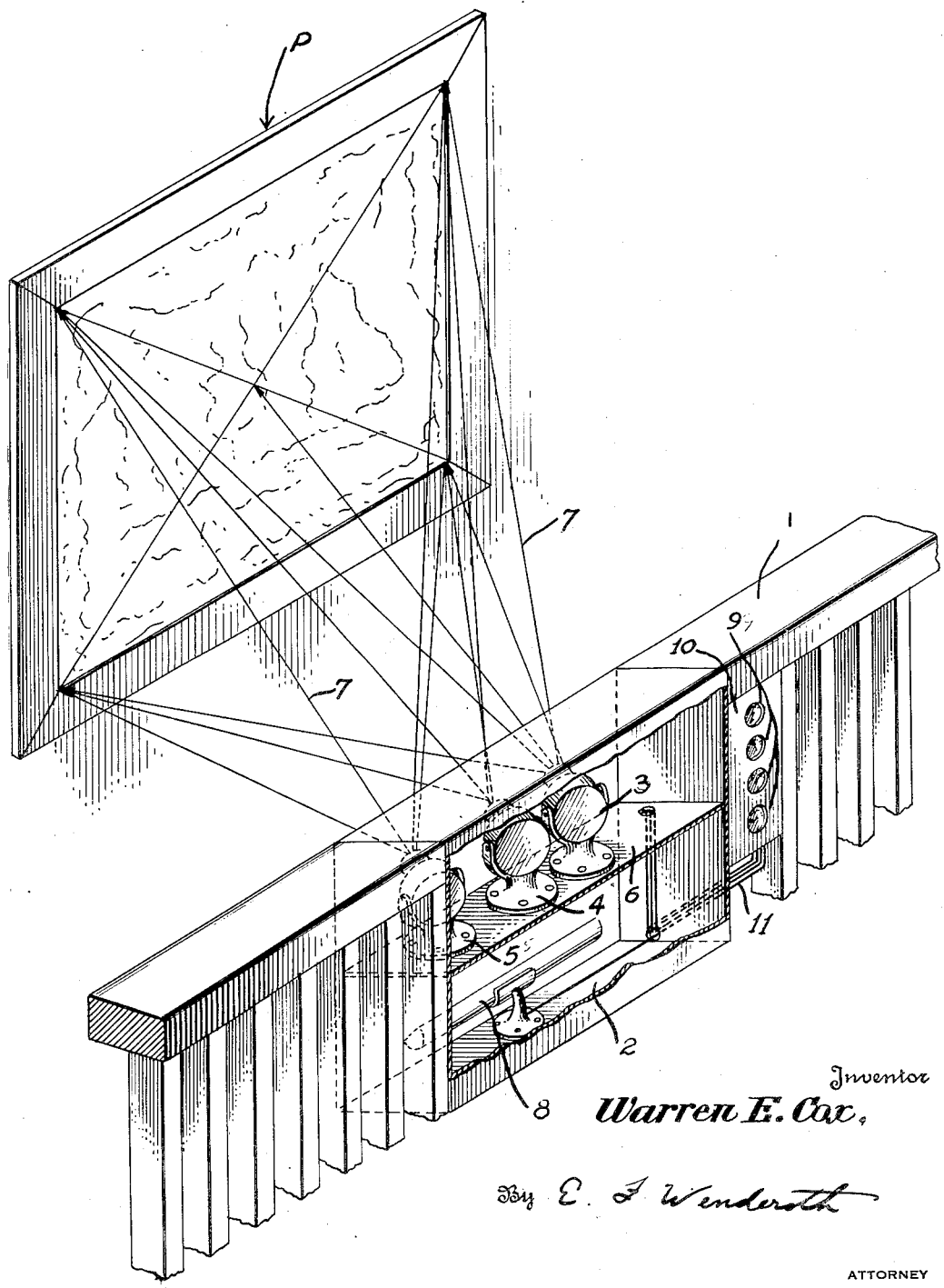
Inventor
Warren E. Cox,
By E. F. Wenderoth
ATTORNEY Patented Oct. 21, 1952

2,615,121

UNITED STATES PATENT OFFICE 2,615,121

ILLUMINATING SYSTEM FOR PAINTINGS AND THE LIKE

Warren Earle Cox, New York, N. Y.

Application May 12, 1949, Serial No. 92,909

1 Claim. (Cl. 240—3.1)

This invention relates to illumination systems in general and more particularly to a system for illuminating pictures in museums or art galleries.

It has long been understood that each painting created by an artist appears best in its particular intensity and color of light. Individual artists do not all paint under the same condition of light. The artist Whistler, for example, did not effect his nocturnes in London smog under the same conditions that the artist Renoir found in the soft sunshine of France. The artist Michelangelo created his masterpieces in a far different light in the Sistine Chapel than the artist Vermeer found in a Dutch interior. Any system therefore of blanket-lighting is a crude approach which must of necessity sacrifice the beauty of some picture if it is to ascertain that of others. Each individual picture has a theme of its own which can be entirely lost as well as the mood due to improper or inadequate lighting. This fact has to do not only with the intensity of the light used but also the slight variations in color accents employed. A picture in which the artist has attempted to create the effect of brilliant hot sunlight can be rendered ineffective by throwing a cold light upon it. A clear sky in a picture can be made to look green or even ominously gray if the light does not contain sufficient blue to violet rays.

In addition to the foregoing drawbacks inherent in the majority of lighting systems utilized in the museums and art galleries today there is also the problem of directing the light or illumination on the picture in such a way that no glare or shadows will be created and that the full beauty of the picture will be apparent to an observer.

The illumination system of the present invention has been carefully devised in order to overcome the aforementioned drawbacks and in order to create a lighting system which will bring forth the natural beauty of a picture in the mood and theme intended by the artist under conditions approximating as closely as possible the conditions under which the picture was made.

A basic principle in accomplishing this purpose is that the light sources should be so located that if the painting should be replaced by a mirror the source of the lighting would not be visible therein for if it were a glare would be produced on the varnish of the painting. It is therefore improper to illuminate pictures or paintings in galleries or museums from above because such lighting is bound to cause halation at the top of the picture. The light source should therefore be placed below the picture and away from the front face thereof. It has been found that light so projected reflects upwards and causes no glare. Furthermore, the light so projected strikes any unevenness of the canvas or any impasto details from a direction closely approximating that of the line of vision and tends not to accent them. On the other hand, light projected from above opposes the line of vision so that it is the shadow side of unevenness of the canvas or of lumps of paint which is seen with a detrimental effect.

A second basic principle made use of is that white light can be produced by any two, three or more complementary colored lights providing that they are thrown from separate sources so that the additive method of mixing the colors is employed. The various colored lights according to the present invention comprise projectors, each having a filter and reflector to produce the complementary colored lights and each of the projectors must be separately operable by, for example, a separate rheostat or other device so that exact balance can be obtained.

The details and structure by which the results of the present invention can be realized as well as further objects of the present invention will be more readily apparent from the following detailed description of a single embodiment of the invention when taken together with the drawing which shows in perspective the relationship of parts to effect the illumination desired.

In the drawing a picture generally designated P has been affixed to a wall such as in a museum or gallery. Situated in front of the picture is a rail 1 which serves the purpose of preventing an observer from leaning over and touching the painting. It has been found that this railing should be set approximately forty inches from the wall on which the painting is hung. A hollow space 2 is provided in the railing. In the hollow space, as shown in the drawing, three light projectors designated as 3, 4 and 5 respectively are arranged on a shelf 6 provided for that purpose. The various lines emanating from the projectors 7 indicate in a general way the manner in which the light rays from the projectors are projected to the painting. Also arranged in the hollow space 2 below the shelf 6 is a fluorescent unit 8 which can be utilized for flood-lighting of the picture. When very large pictures are shown it has been found desirable to have the whole projecting device set to the right or left of the picture, if the bottom of the picture is below the eye level, as this eliminates glare on the bottom portion, which otherwise results. It is only necessary that the projectors be in the general proximity of the picture.

In order to create the balance of colors necessary so that white light can be obtained it is necessary that complementary colors be projectable from the projectors and also the white light produced must be at maximum intensity obtainable. The spot lights constituting the projectors need not be of any specific type so long as their lenses are of sufficiently wide angle and further providing that the light can be masked to fit the picture accurately. The spot light 3 in the drawing is provided for example with a blue filter and should be capable of providing a minimum of 400 watts of illumination. The spot light 4 has a rose or pale red filter with a minimum intensity of 250 watts. The spot light 5 is provided with an amber or yellow filter and has a minimum intensity of 250 watts. It has been found in actual practice that light from a plurality of projectors such as the present will create white light through the use of any two complementary colors, any three or any higher number up to a full spectrum, but in addition it has been found that no less than three are proper for the present purpose.

In order that the proper balance of light and intensity can be obtained a separate rheostat or other device to accomplish the purpose is provided for each of the lights. In the embodiment disclosed in the drawings these rheostats 9 are arranged on a panel 10 in the rail and have electrical connections 11 leading therefrom to the individual projectors. If desired, a cover can be placed over the rheostats and locked so as to prevent tempering therewith after the lights have been properly adjusted.

As previously pointed out each of the projectors must be carefully focused upon the one picture to which the light is directed and the projectors should produce perfectly flat evenly distributed light which necessitates wide-angle lenses since they are to illuminate large pictures from a relatively short distance. What is actually effected by utilizing the plurality of light units is that colors may be brought into the neutral which may be lacking since white light actually is made up of various component lights and all white light is not the same. If the resultant light is not sufficiently strong in a white it is probably due to the fact that the components thereof do not cover certain parts of the spectrum. White may be thought of as a balance of colors but not necessarily as a complete range. For this reason the numerous sources of light, each of which is under complete and delicate control, are necessary in order to bring out the finest qualities of painting. In the present invention the light can be controlled as to intensity to a very accurate degree by rheostats. The color of the light can be qualified from white towards any set of complementary colors such as blue, yellow or red, or towards any mixture of these (such as secondary colors like green, orange and lavender) very subtilely and to a very accurate degree. In fact, through the proper blending of the complementary three colors any tint can be obtained. Also any set of opposing or complementary colors can be used so long as they balance. The use of blue, yellow and red has been recommended because artists think of these as their primary colors. These facts assure the proper light being thrown on the painting and by the use of a section of railing or the like as shown in the drawings the light can be thrown upwards toward the picture instead of, as is customary, downwards thus eliminating the glare on the varnish of the picture as has been set forth heretofore. Due to the arrangement of the projectors the entire picture will be uniformly lighted with the desired color and with the desired intensity.

The original cost of a lighting system such as disclosed in the present invention is a small fraction of building skylights, heavy projecting devices and second skylights over them as is customary at present in most museums although in numerous buildings inadequate lighting is provided whereby the picture loses much of the desired effect of the creating artist.

It is apparent of course that various changes in detail can be effected in the arrangement described herein and in the details thereof without departing from the scope of the present invention.

I claim:

In an installation for illuminating and viewing paintings and the like, a base, a plurality of independent light sources on said base generally equidistant from the painting, each light source having associated therewith means for directing a beam of light simultaneously and uniformly against the entire surface of the painting, with each such beam defined to conform precisely to the field of the painting, the field of all the beams precisely coinciding, each such beam being precisely focused upon the painting, means for differentially coloring each such beam, the intensity of each beam being different from that of the other beams, and means for independently controlling the intensity of each beam.

WARREN EARLE COX.

REFERENCES CITED

The following references are of record in the file of this patent:

UNITED STATES PATENTS

| Number | Name | Date |
| --- | --- | --- |
| 973,962 | Oliver | Oct. 25, 1910 |
| 1,614,837 | Goldstone et al. | Jan. 18, 1927 |
| 1,871,794 | Hough | Aug. 16, 1932 |
| 1,880,026 | Singerman | Sept. 27, 1932 |
| 2,207,919 | Harrison | July 16, 1940 |
| 2,224,686 | Leavitt | Dec. 10, 1940 |

FOREIGN PATENTS

| Number | Country | Date |
| --- | --- | --- |
| 631,319 | France | Sept. 12, 1927 |

OTHER REFERENCES

Luckiesh: Lighting Fixtures and Lighting Effects, 1925, pages 36–43.